US008104491B2

(12) United States Patent
Li (10) Patent No.: US 8,104,491 B2
(45) Date of Patent: Jan. 31, 2012

(54) OUTDOOR SHADING DEVICE WITH RENEWABLE POWER SYSTEM

(76) Inventor: Wanda Ying Li, Santa Ana, CA (US)

( * ) Notice: Subject to any disclaimer, the term of this patent is extended or adjusted under 35 U.S.C. 154(b) by 195 days.

(21) Appl. No.: 12/317,533

(22) Filed: Dec. 23, 2008

(65) Prior Publication Data

US 2010/0154786 A1     Jun. 24, 2010

(51) Int. Cl.
*A45B 3/02* (2006.01)
*A45B 23/00* (2006.01)

(52) U.S. Cl. .............. 135/16; 135/98; 135/21; 135/910; 362/102; 136/244

(58) Field of Classification Search .............. 135/91–94, 135/96, 98, 156, 115, 119, 16, 33.2, 33.4, 135/21, 910; 362/102; 47/17; 136/244
See application file for complete search history.

(56) References Cited

U.S. PATENT DOCUMENTS

| | | | | |
|---|---|---|---|---|
| 5,172,711 A * | 12/1992 | Mueller et al. | ................. | 135/16 |
| 5,273,062 A * | 12/1993 | Mozdzanowski | ............... | 135/16 |
| 6,612,713 B1 * | 9/2003 | Kuelbs | ......................... | 362/102 |
| 6,837,255 B2 * | 1/2005 | Bunch et al. | .................... | 135/16 |
| 6,840,657 B2 * | 1/2005 | Tung | ............................. | 362/352 |
| 7,128,076 B2 * | 10/2006 | Freedman | .................... | 135/20.3 |
| 7,604,015 B2 * | 10/2009 | Fraser | .............................. | 135/31 |
| 2004/0228118 A1 * | 11/2004 | Peterson | ....................... | 362/102 |
| 2005/0161067 A1 * | 7/2005 | Hollins | ........................... | 135/16 |
| 2008/0092440 A1 * | 4/2008 | Johnson | ........................ | 47/48.5 |
| 2008/0092936 A1 * | 4/2008 | Carabillo | ........................ | 135/16 |
| 2010/0326849 A1 * | 12/2010 | Trimarche et al. | ............ | 206/223 |
| 2011/0023931 A1 * | 2/2011 | Chen | ............................. | 136/244 |

FOREIGN PATENT DOCUMENTS

JP           08158702 A   *   6/1996
JP        2002204710 A   *   7/2002

* cited by examiner

*Primary Examiner* — Winnie Yip
(74) *Attorney, Agent, or Firm* — Raymond Y. Chan; David and Raymond Patent Firm (57) ABSTRACT

An outdoor shading device includes a supporting frame, a shading awning supported by the supporting frame to define a shading area underneath the shading awning, and a solar power system. The solar power system includes a solar collecting unit having a solar collecting surface overlapped on the shading awning for solar energy collection, and a power storage supported at the supporting frame to electrically connect to the solar collecting unit, wherein when the shading awning is orientated for providing shade from the sun, the solar collecting surface of the solar collecting unit is aligned with the direction of the sun to maximize the solar energy collection, such that after the solar energy is collected, the solar collecting unit converts the solar energy into electrical energy and stored in the power storage.

13 Claims, 12 Drawing Sheets

OUTDOOR SHADING DEVICE WITH RENEWABLE POWER SYSTEM

BACKGROUND OF THE PRESENT INVENTION

1. Field of Invention

The present invention relates to an outdoor shading device of the type and size suitable for use outdoor environment or like, and more particularly to an outdoor shading device with a renewable power system so that the outdoor shading device can collect the energy from natural resources, such as sunlight or wind, and convert it into the electrical power for electronic devices such as light, video, and fan etc.

2. Description of Related Arts

Outdoor shading device are usually provided in a campground, on a beach, or in the back yard of the house to give a pleasant shade for a user under the sun. Usually, the user uses the outdoor shading device especially on a sunshine day to prevent the sun directly pours on the user and coolers the temperature. Meanwhile, the user may want to listen to the music through a portable music player, charging the cell phone, or turning on the portable fan etc. Accordingly, a solar power system is provided at the outdoor shading device such as outdoor umbrella for storing the solar power during the day time, so that the outdoor umbrella also provides the power source for the electronic devices without any extension cores. The stored power can be also used during the night time to provide an illumination system under the shading device. Conventionally, the solar panel mounts on the top of the umbrella to collect the solar power. However, the area of the solar panel is relatively small and hard to adjust the angle aligning with the sun to gain the maximum energy. Also, the existed auto angle adjust solar panel is provided at the outdoor umbrella, but the cost is high, the structure is complicated, and it is easy to be broken.

Moreover, such outdoor shading device with solar power system may not provide enough power sources for the electrical devices. The area of the solar panel is limited and not easy to adjust the panel toward the sun to get the efficiency solar power.

SUMMARY OF THE PRESENT INVENTION

A main object of the present invention is to provide an outdoor shading device with a renewable power system, wherein the shading device with the renewable power supply is adapted to convert energy from natural resources into electrical energy so as to activate the electronic devices for providing power source.

Another object of the present invention is to provide an outdoor shading device with a renewable power system which comprises a solar panel provided on the shading awning of the shading device for providing an efficiency collecting of solar energy.

Another object of the present invention is to provide an outdoor shading device with a renewable power system, wherein the angle of the solar panel of the solar power system can be adjusted toward the sun through the adjustment of the shading awning to collect the maximum solar energy and have a relatively bigger shading area under the sun.

Another object of the present invention is to provide an outdoor shading device with a renewable power system for providing an independent, environmentally-friendly and economical power source to the electronic devices.

Another object of the present invention is to provide an outdoor shading device with a renewable power system, wherein the solar power system can collect solar energy during daytime when the outdoor shading device such as an umbrella is in normal operation, and deliver electrical energy to the electronic devices during nighttime such as providing the light in a fairly dark environment. In other words, no intentional charging process is required when the outdoor shading device is not in use.

Another object of the present invention is to provide an outdoor shading device with a renewable power system, wherein the solar power system can be selectively switched to provide power to the electronic devices for activate the electronic devices, or to only storing electrical energy for reserving power for future use.

Another object of the present invention is to provide an outdoor shading device incorporated with a renewable power system which does not significantly alter the original structure of the outdoor shading device, so as to minimize the manufacturing and marketing costs of the outdoors shading device.

Another object of the present invention is to provide an outdoor shading device incorporated with a renewable power system, wherein no complicated mechanical and electrical process are involved in installing and mounting the renewable power supply and illumination system on the outdoor shading device.

Accordingly, in order to accomplish the above objects, the present invention provides an outdoor shading device, comprising:

a supporting frame which comprises a standing frame and an awning frame supported by the standing frame;

a shading awning supported by the awning frame to define a shading area underneath the shading awning; and a renewable power system, which comprises:

a renewable collecting unit supported by the supporting frame for collecting energy from natural resources, and a power storage supported at the supporting frame to electrically connect to the renewable collecting unit, wherein when the renewable collecting unit collects the energy, the energy is converted into electrical energy and stored in the power storage.

These and other objectives, features, and advantages of the present invention will become apparent from the following detailed description, the accompanying drawings, and the appended claims.

DETAILED DESCRIPTION OF THE PREFERRED EMBODIMENT

Figure 1:
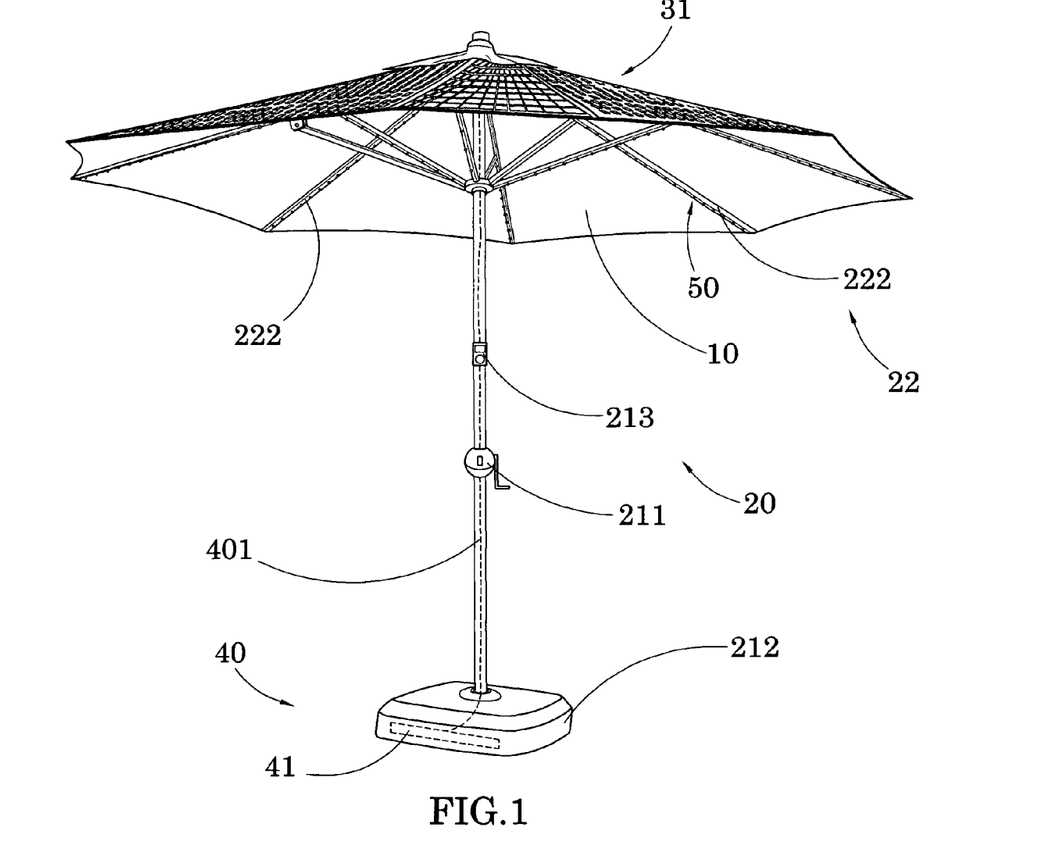
FIG. 1 is the perspective view of an outdoor shading device according to a preferred embodiment of the present invention, illustrating an unfolded position of the outdoor shading device.

Referring to FIG. 1 of the drawings, an outdoor shading device with a solar power system according to a preferred embodiment is illustrated, wherein the outdoor shading device a shading awning 10, an supporting frame 20 which supports the shading awning 10, and a renewable power system which collects energy from natural resources, such as sunlight or wind, and convert it into the electrical power for providing the power source to the electronic devices The supporting frame 20 comprises a standing frame 21 which comprises a base 212, and an awning frame 22 supporting the shading awning 10 on top of the awning frame 22 thereon, wherein the standing frame 21 and the awning frame 22 are pivotally coupling with each other for adjusting the orientation of the shading awning 10 supported on the awning frame 22 thereon, so that the shading awning 10 is orientated for providing the maximum shade area from the sun.

Accordingly, the awning frame 22 comprises an upper housing 221 and a plurality of awning supporting arms 222 outwardly and radially extended from the upper housing 221 in such a manner that they are adapted to move between a folded position and an unfolded position via a manual operator 211, wherein in the unfolded position, the awning supporting arms 222 are pivotally and outwardly extended to support the shading awning 10 thereon and to define a shading area under the awning supporting arms 222, wherein in the folded position, the awning supporting arms 222 are pivotally and inwardly folded to overlappedly lay in position.

The renewable power system comprises a renewable collecting unit supported by the supporting frame 20 for collecting energy from natural resources, and a power storage supported at the supporting frame 20 to electrically connect to the renewable collecting unit, wherein when the renewable collecting unit collects the energy, the energy is converted into electrical energy and stored in the power storage. According to the preferred embodiment, the renewable power system is a solar power system which converts solar power energy into electrical energy.

Figure 2:
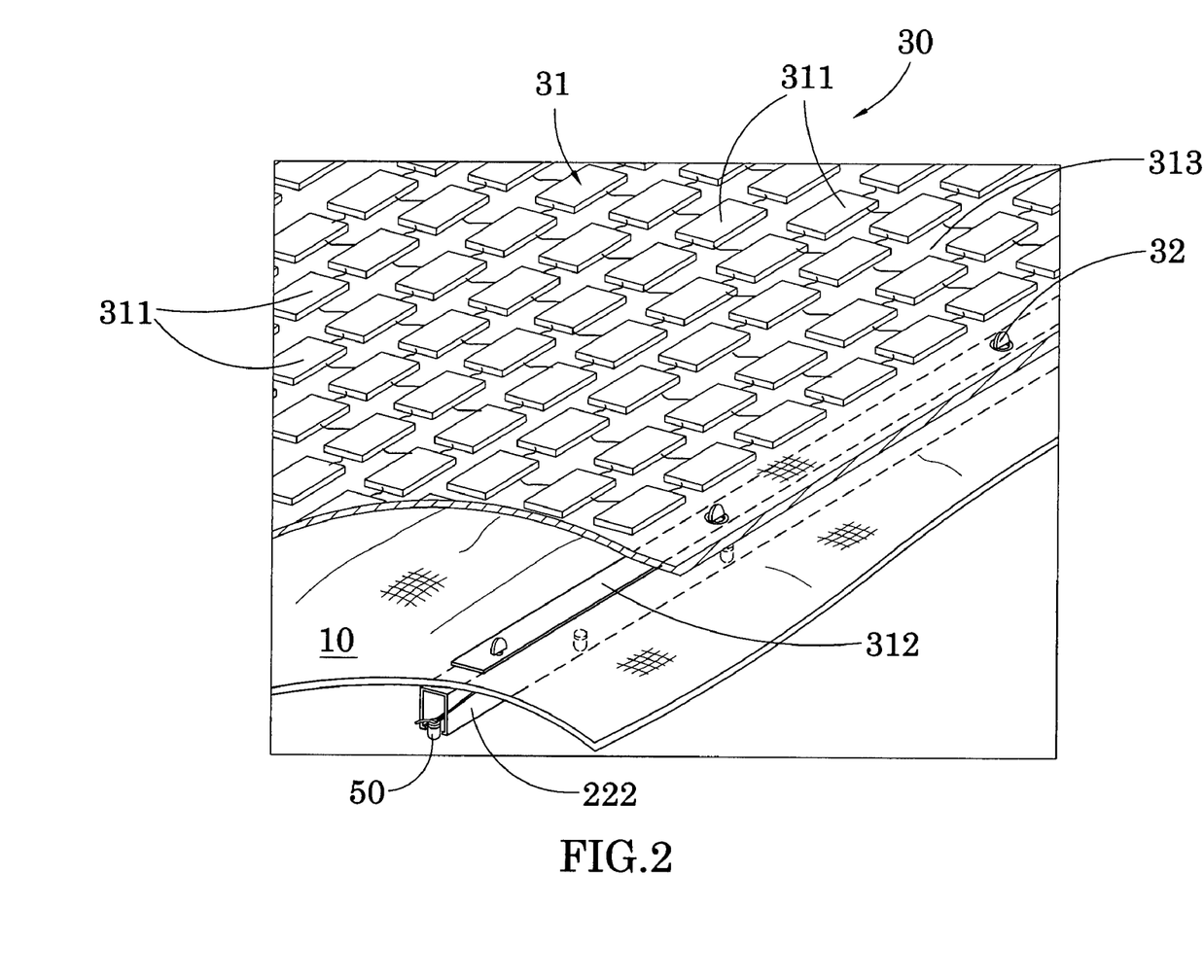
FIG. 2 is the sectional view of the outdoor shading device according to the above preferred embodiment of the present invention, illustrating the renewable power system as a solar power system that a plurality of discrete solar panel are coupling with a shading awning supported by the awning frame.

Referring to FIGS. 1 and 2 of the drawings, the solar power system comprises a solar collecting unit 30 supported by a top portion of the awning frame 22, wherein the solar collecting unit 30 has a solar collecting surface 31 arranged to face toward the sunlight so that it can be exposed to sunlight for extensively collecting solar energy by adjusting the orientation of the awning frame 22. Moreover, the solar collecting unit 30 is adapted to collect solar energy from the sunlight impinged on the solar collecting surface 31 of the solar collecting unit 30, and convert the collected solar energy into electrical energy, wherein the electrical energy can be stored for further use.

Accordingly, the solar collecting surface 31 of the solar collecting unit 30 has a plurality of discrete solar panels 311 foldably and electrically coupled with each other side-by-side as shown in FIG. 2, wherein the discrete solar panels 311 are attached to a backing awning 313 and further incorporated with the shading awning 10 by a plurality of reinforcing arms 312 alignedly coupled with the awning supporting arms 222 of the awning frame 22 to lock and retain the solar collecting surface 31 of the solar collecting unit 30 on the shading awning 10, so that the discrete solar panels 311 are orientated to match with a contour of the shading surface of the shading awning 10. A plurality of locker 32 are provided to lock the reinforcing arms 312 with the awning supporting arms 222 respectively. The discrete solar panels 311 incorporated with the backing awning 313 is alignedly overlaid on the shading awning 10 to fully utilize a shading surface of the shading awning 10 so as to maximize a gain of the solar energy. Since the discrete solar panels 311 are foldably coupled with each other side-by-side, the shading awning 10 is adapted to be folded up as the discrete solar panels 311 are overlain on the shading awning 10.

It is worth to mention that the awning frame 22 of the supporting frame 20 of the outdoor shading device is pivotally coupled with the standing frame 21 to selectively adjust a shading angle of the shading awning 10 for maximizing the shading area thereof and for aligning the solar collecting surface 31 of the solar collecting unit 30 towards the direction of the sun to maximize the gain of solar energy. In other words, when the shading awning 10 is selectively adjusted its orientation, the outdoor shading device not only maximizes the shading area of the shading awning 10 but also adjusts the alignment of the solar collecting surface 31 to the direction of the sun at the same time.

Figure 3:
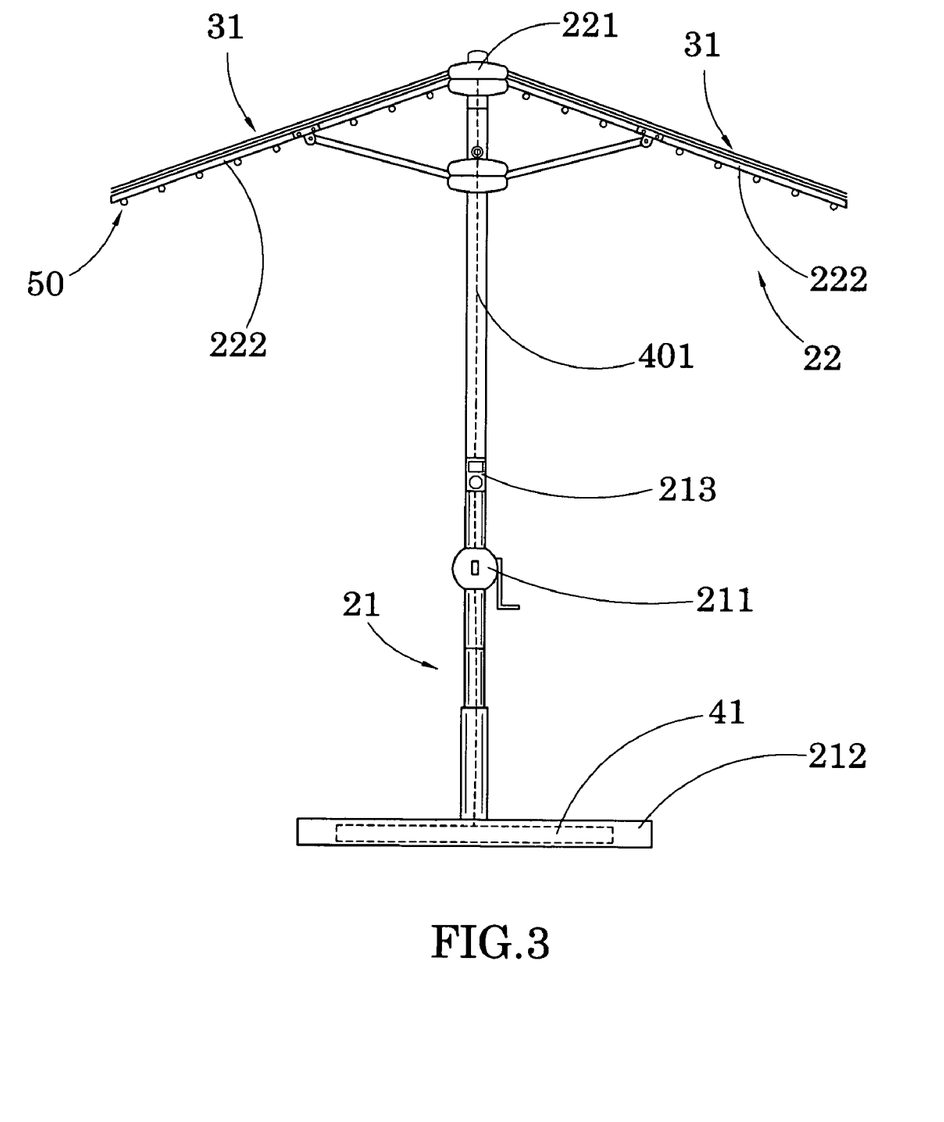
FIG. 3 is the perspective view of the outdoor shading device according to the above preferred embodiment of the present invention, illustrated the outdoor shading device incorporated with an illumination system.

Referring to FIGS. 1, 2, and 3 of the drawings, the solar power system further comprises a power storage 40 electrically connected to the solar collecting unit 30 received in the base 212 of the standing frame 21, wherein the power storage 40 electrically connects to a power outlet 213 supported by the standing frame 21 in a hand-reachable position for plugging and unplugging the electronic devices so that the electric energy from the power storage 40 can provide electricity to the electronic devices through the power outlet 213. The power storage 40 having one or more rechargeable batteries 41 can store the electrical energy converted from the solar energy, so that the solar power system can provide the electricity to the electronic devices even in the fair light, wherein the power storage 40 further connects to an illumination unit or speaker unit 50 coupling with the awning supporting arms 222 of the awning frame 22 so that the outdoor shading device also provide an illumination system for using in a dark environment.

It is worth to mention that the rechargeable battery 41 is placed at the base 212 of the supporting frame 21, wherein the rechargeable battery 41 not only forms an energy storage for storing the electrical energy converted from the renewable energy but also provides a predetermined weight at the base 212 for stabilization of the awning frame 22. In other words, the user does not require adding additional weight, such as water or sand, at the base 212 as the conventional outdoor shading device in order to keep the outdoor shading device in a stable manner.

Accordingly, the power storage 40 is electrically coupled with said solar collecting unit 30 through an electrical cable 401 which is extended through interiors of the awning frame 22 and the standing frame 21 in a hidden manner. Therefore, the electrical cable 401 is protected by the supporting frame 20 to prevent the damage of the electrical cable 401 especially during the folding operation of the awning shading 10.

Figure 4:
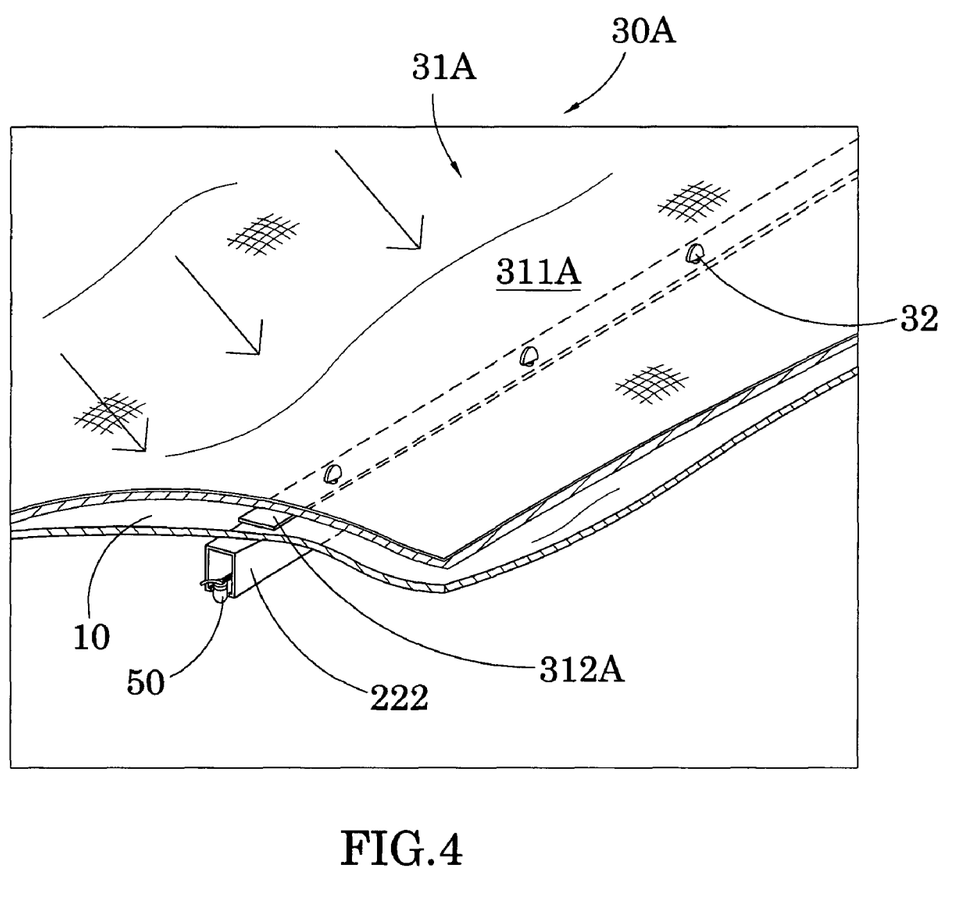
FIG. 4 is the sectional view of an alternative solar panel coupling with the shading awning of the outdoor shading device according to the above preferred embodiment of the present invention.

FIG. 4 illustrates an alternative mode of the solar collecting unit 30A, wherein the solar collecting unit 30A comprises a flexible solar layer 311A overlaid on the shading awning 10 by a reinforcing arms 312A to couple with the awning supporting arms 222 of awning frame 22 to retain the solar collecting surface 31A on the shading awning 10. The flexible solar layer 311A is overlaid on the shading awning to fully utilize the shading awning 10 and to match the contour of the shading awning 10 so as to maximize the gain of solar energy.

Figure 5:
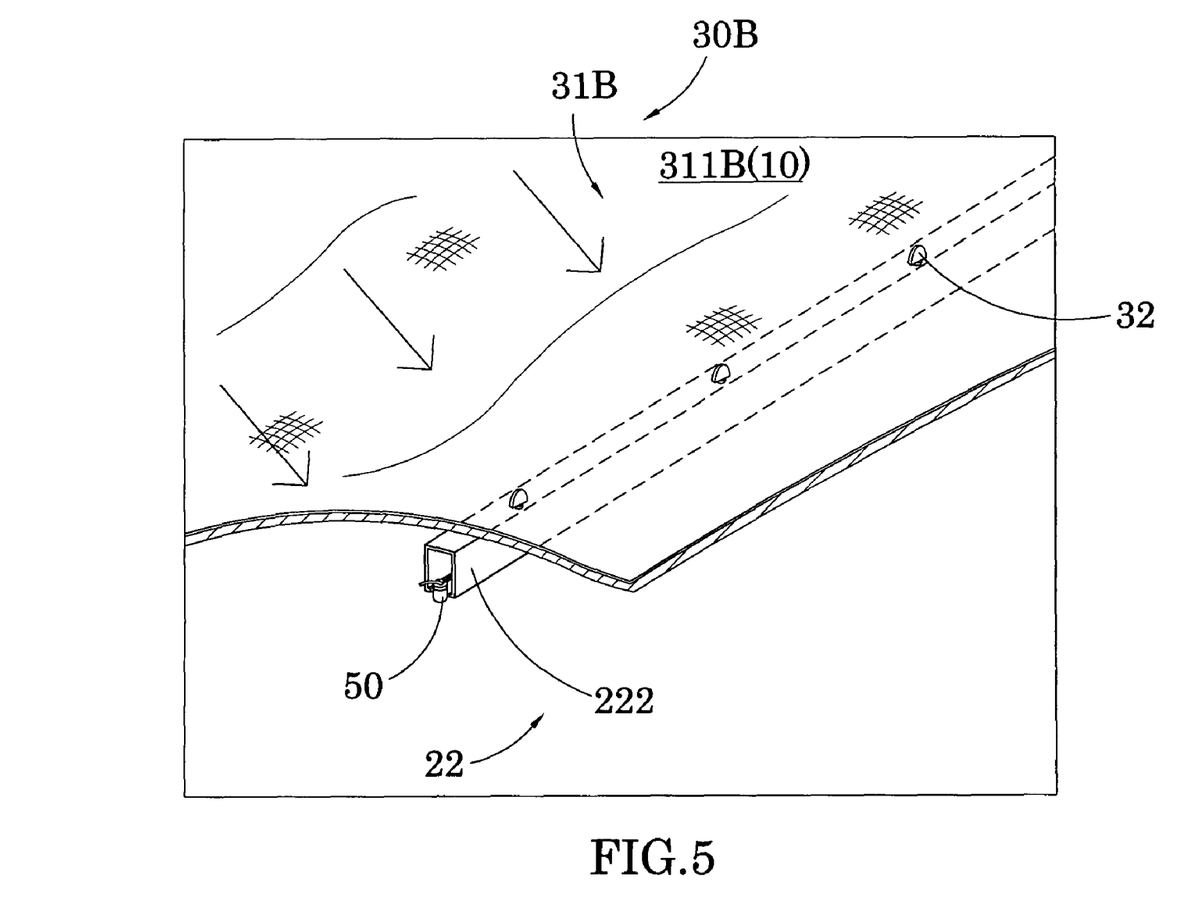
FIG. 5 is the sectional view of the alternative solar panel incorporated with the shading awning of the outdoor shading device according to the above preferred embodiment of the present invention.

Referring to FIG. 5 of the drawings, another alternative solar collecting unit 30B is illustrated, wherein the solar collecting unit 30B has a flexible solar layer 311B integrally incorporated with the shading awning 10 to match the contour of the shading awning 10 and to fully utilize the shading awning 10 so as to maximize the gain of solar energy. In other words, the flexible solar layer 311B is integrally attached on the shading surface of the shading awning 10 to form a one piece parasol structure for providing a dual-function of sun shading and solar energy collection.

The solar power system can be further incorporated with different shapes of shading devices such as a housing-shaped shading device.

Figure 6:
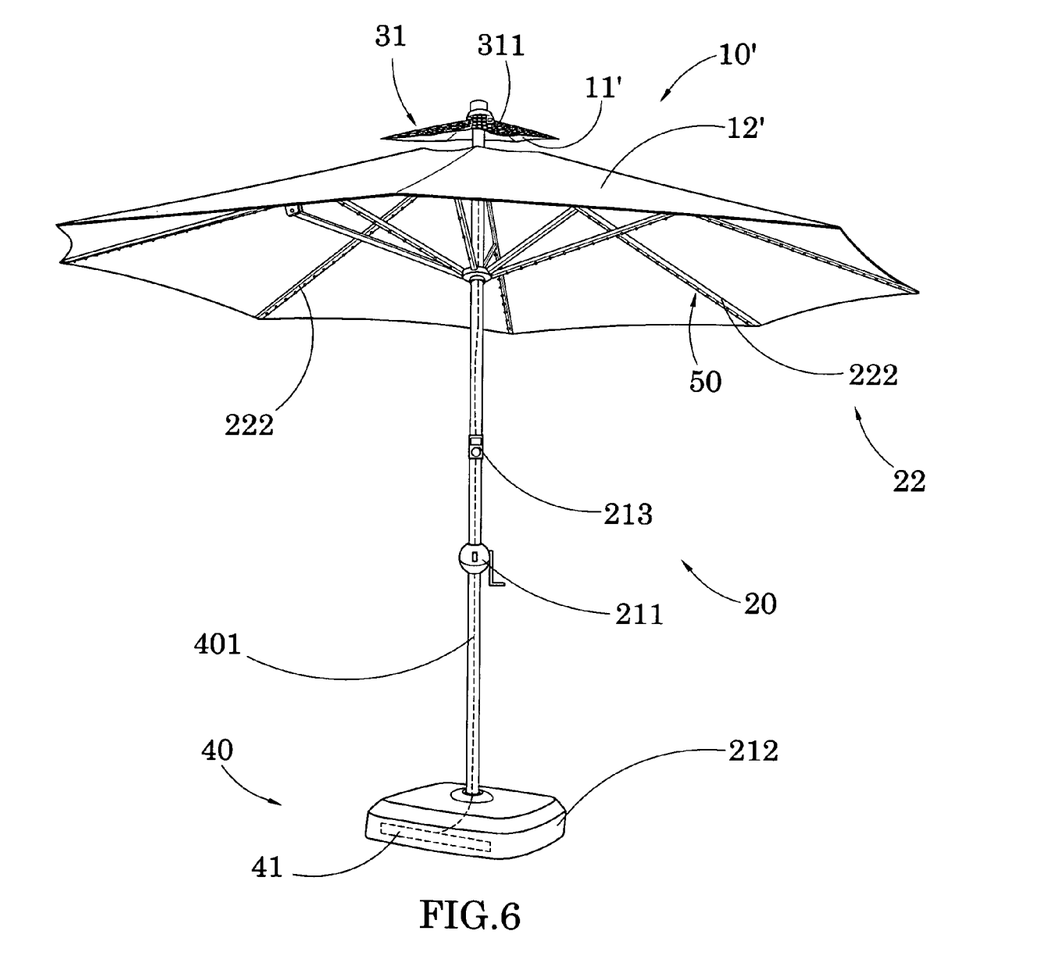
FIG. 6 illustrates the solar power system incorporating with an alternative outdoor shading device according to the above preferred embodiment of the present invention.
Figure 7:
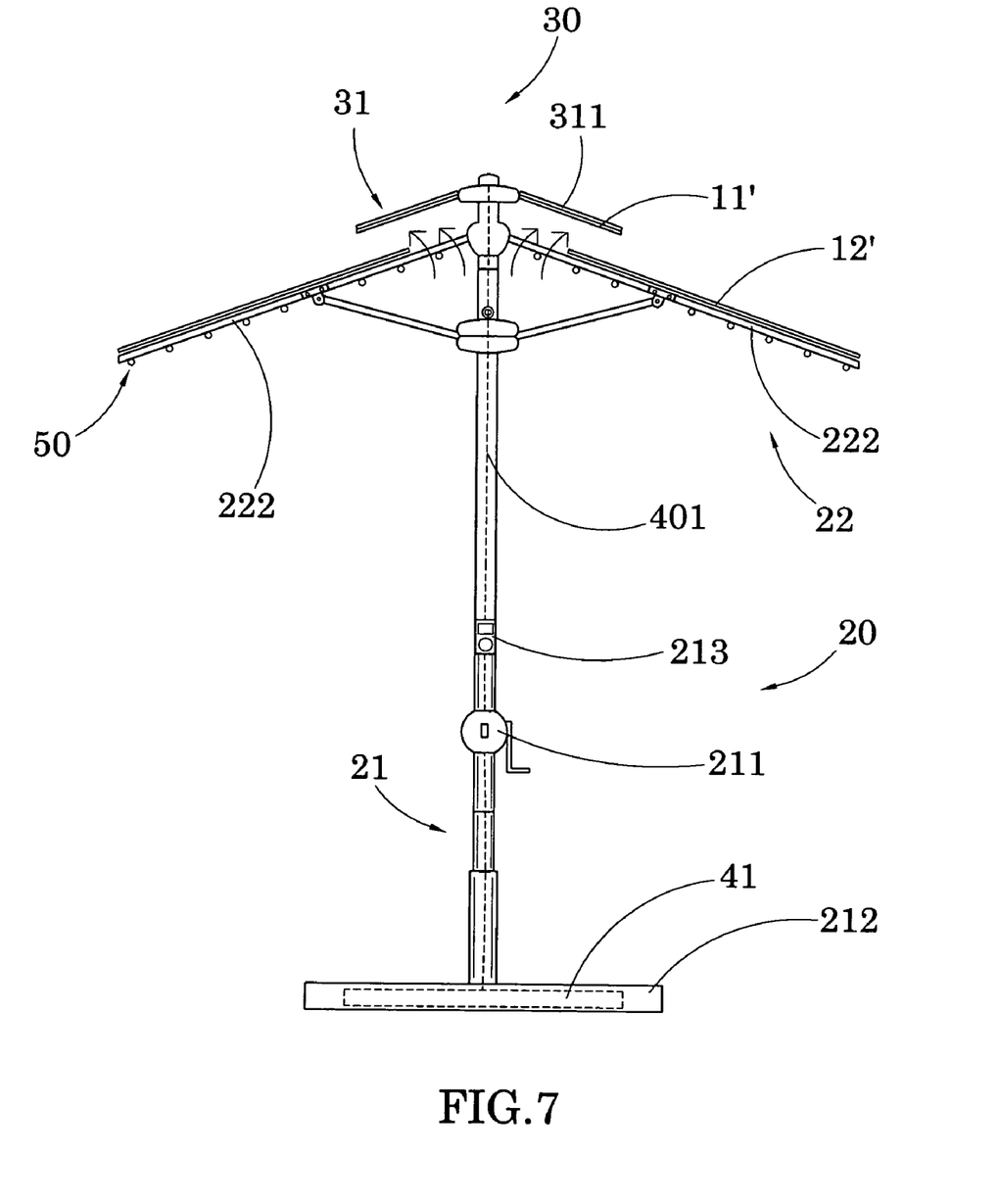
FIG. 7 is sectional view of the alternative outdoor shading device with the solar power system according to the above preferred embodiment of the present invention.

FIG. 6 illustrates the solar power system incorporating with an alternative mode of the shading awning 10' of the outdoor shading device. As shown in FIGS. 6 and 7, the shading awning 10' comprises an upper awning 11' supported at the top end portion of the supporting frame 20 and a lower awning 12' supported underneath the upper awning 11'. Accordingly, the size of the upper awning 11' is smaller than the size of the lower awning 12', wherein the lower awning 12' has a center hollow portion positioned below the upper awning 11' for air circulation. Therefore, the hot air within the shade area will be circulated through the space between the upper and lower awnings 11', 12' at the center hollow portion of the lower awning 12'.

Accordingly, the solar collecting surface 31 of the solar collecting unit 30 is provided on the upper awning 11' to face towards the sunlight so that it can be exposed to sunlight for extensively collecting solar energy by adjusting the orientation of the awning frame 22. In addition, the discrete solar panels 311 of the solar collecting unit 30 are attached to the upper surface of the upper awning 11'. In other words, all structural configurations of the solar power system as shown in FIG. 2 are used to apply to the upper awning 11'. Likewise, the alternative modes of the solar power system as shown in FIGS. 4 and 5 can also be applied to the upper awning 11'.

Figure 8:
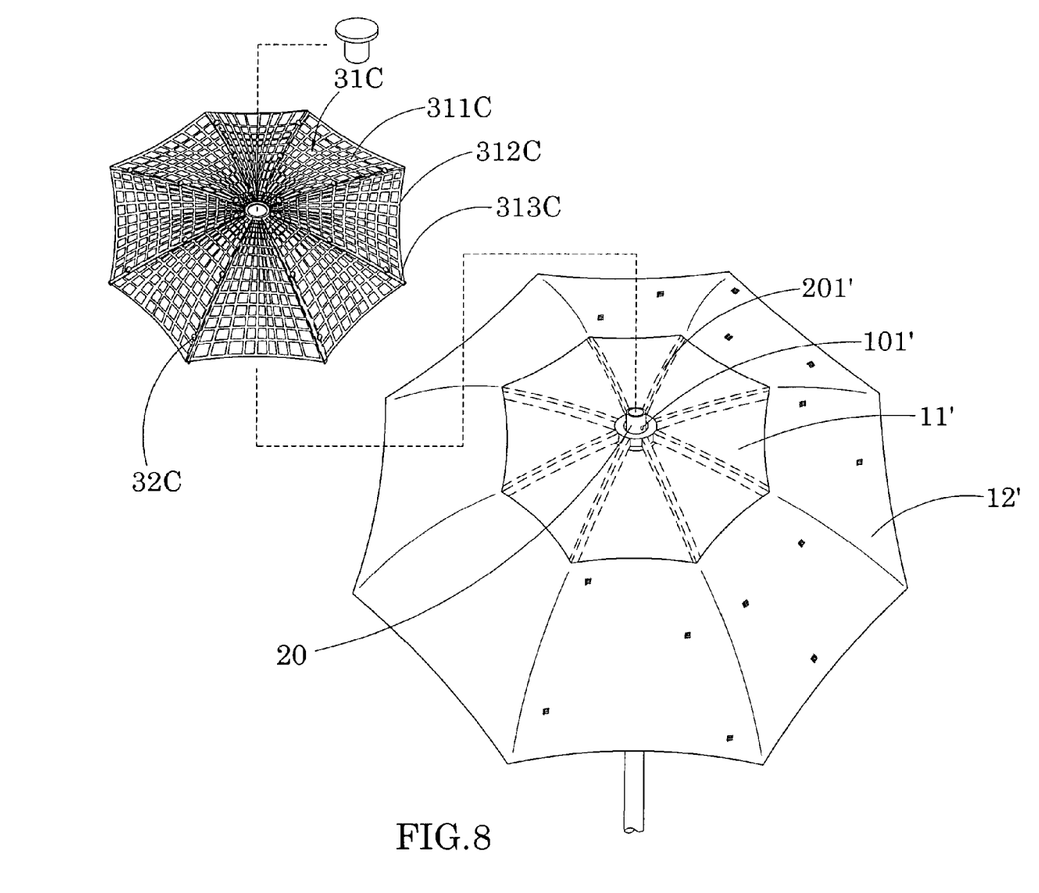
FIG. 8 illustrates an alternative mode of the solar power system for the outdoor shading device according to the above preferred embodiment of the present invention.

FIG. 8 illustrates an alternative mode of the solar power system incorporating with the upper awning 11'. Accordingly, the solar power system is detachably coupled with the upper awning 11'. The discrete solar panels 311C are foldably and electrically coupled with each other side-by-side as shown in FIG. 8, wherein the discrete solar panels 311C are attached to a backing awning 313C to form a solar collecting layer. The solar collecting layer is overlapped on the upper surface of the upper awning 11'. A terminal 101' is provided at the supporting frame 20 to electrically and detachably connect to the solar collecting layer when the solar collecting layer is overlapped on the upper awning 11'. When the upper awning 11' is supported by a plurality of upper arms 201', the reinforcing arms 312C of the solar collecting layer can be alignedly coupled with the upper arms 201' to lock and retain the solar collecting surface 31C of the solar collecting unit 30C on the upper awning 11' via the locker 32C, so that the discrete solar panels 311C are orientated to match with a contour of the shading surface of the upper awning 11'. Therefore, the discrete solar panels 311C incorporated with the backing awning 313C is alignedly overlaid on the upper awning 11' to fully utilize a shading surface of the upper awning 11' so as to maximize a gain of the solar energy.

Figure 9:
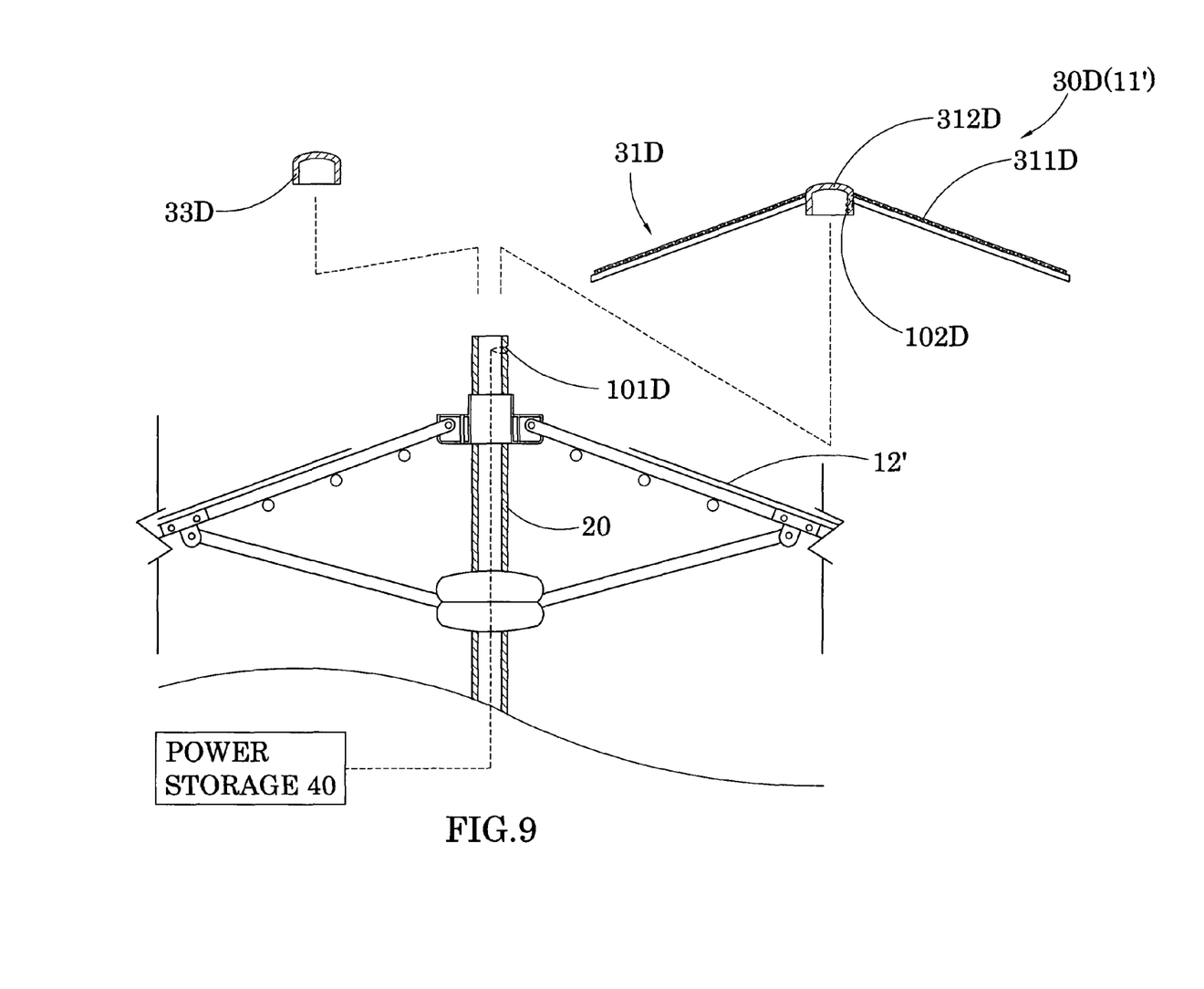
FIG. 9 illustrates another alternative mode of the solar power system for the outdoor shading device according to the above preferred embodiment of the present invention.

FIG. 9 illustrates another alternative mode of the solar power system incorporating with the upper awning 11'. The solar power system comprises a center hub 312D detachably coupling with the top end of the supporting frame 20 and a rigid solar panel 311D radially extended from the center hub 312D to define the solar collecting surface 31D on the solar panel 311D. Accordingly, when the center hub 312D is attached to the supporting frame 20, the solar panel 311D is radially extended from the supporting frame 20 to form the upper awning 11'. In other words, the solar panel 311D is a replacement of the upper awning 11'. For electrically connection, a first terminal 101D is provided at the supporting frame 20 to electrically link with the power storage 40 while the second terminal 102D is provided at the inner side of the center hub 312D to electrically link with the solar panel 311D such that when the center hub 312D is attached to the supporting frame 20, the second terminal 102D is electrically contacted with the first terminal 101D so as to electrically link the power storage 40 with the solar panel 311D. Preferably, the first terminal 101D is a socket and the second terminal 102D is a retractable plug to electrically contact with the first terminal 101D. A protection cap 33D is used for detachably coupling at the top end of the supporting frame 20 to protect the first terminal 101D when the center hub 312D is detached from the supporting frame 20.

Figure 10:
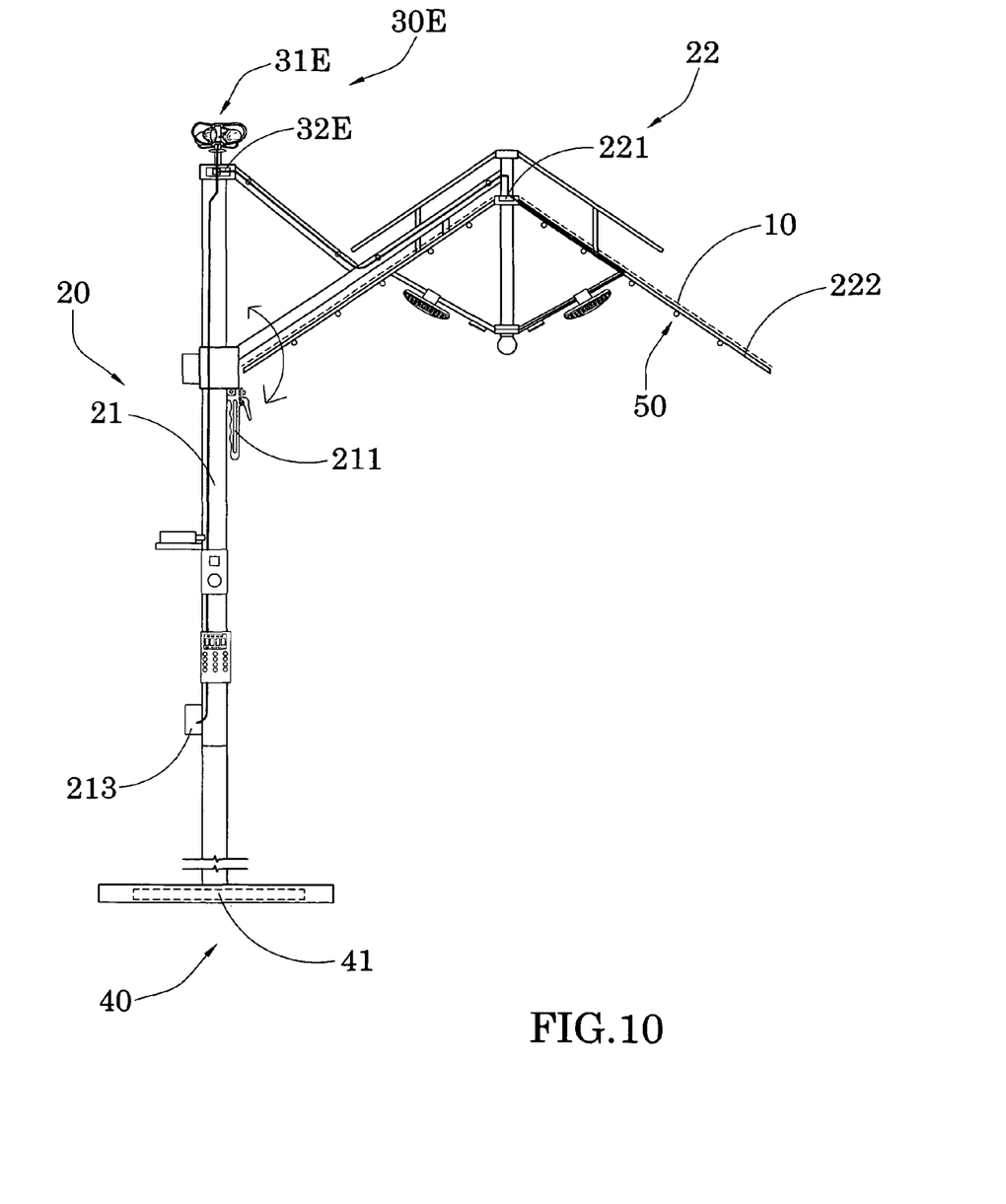
FIG. 10 illustrates an alternative mode of the renewable power system of the outdoor shading device according to the above preferred embodiment of the present invention, illustrating the renewable power system as a wind power system.

FIG. 10 illustrates an alternative mode of the renewable power system of the outdoor shading device, wherein the renewable power system is a wind power system for collecting wind energy. FIG. 10 also illustrates different types of the supporting frame 20 while the operation of the outdoor shading device is the same as the above mentioned embodiment.

Accordingly, the wind power system comprises a wind collecting unit 30E supported by a top portion of the supporting frame 20 for extensively collecting wind energy. Moreover, the wind collecting unit 30E is adapted to collect wind energy and to convert the collected wind energy into electrical energy, wherein the electrical energy can be stored for further use.

The wind collecting unit 30E comprises a wind turbine 31E supported at the top end of the standing frame 21 for being run by airflow and an energy converting unit 32E converting the wind power as kinetic energy into electrical energy. Similar to the solar power system 30, the electrical energy converted from the wind energy is stored in the power storage 40. Accordingly, the wind turbine 31E comprises a plurality of wind collecting blades for collecting wind energy, wherein airflow (wind) is used to run the wind turbine 31E to generate a rotational kinetic energy. Such kinetic energy can be converted into electrical energy via the energy converting unit 32E supported at the supporting frame 20 so as to store the electrical energy at the power storage 40.

Figure 11:
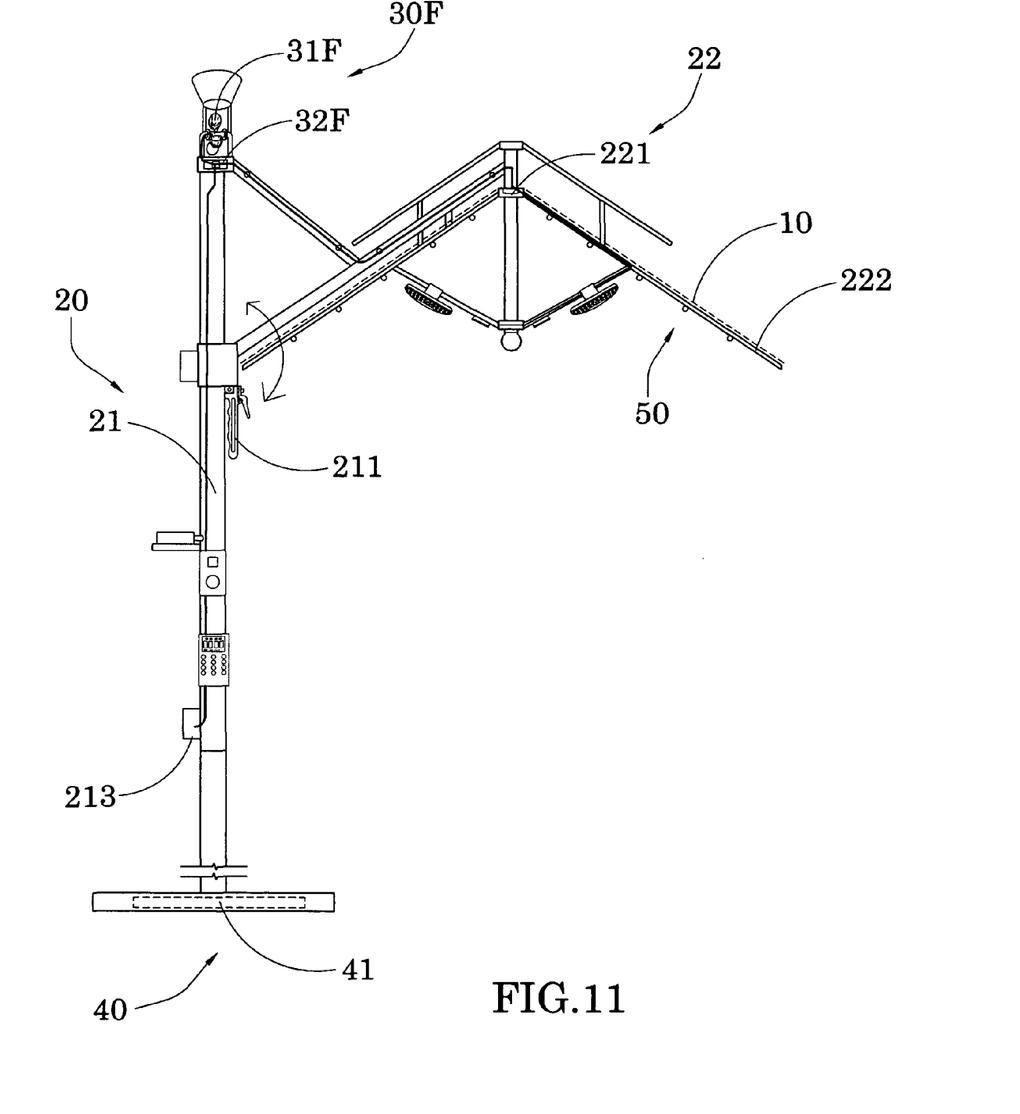
FIG. 11 illustrates another alternative mode of the renewable power system of the outdoor shading device according to the above preferred embodiment of the present invention, illustrating the renewable power system as a rain power system.

FIG. 11 illustrates a second alternative mode of the renewable power system of the outdoor shading device, wherein the renewable power system is a rain power system for collecting water (rainfall) energy.

Accordingly, the rain power system comprises a rain collecting unit 30F supported by a top portion of the supporting frame 20 for extensively collecting water energy. Moreover, the rain collecting unit 30F is adapted to collect water energy and to convert the collected wind energy into electrical energy, wherein the electrical energy can be stored for further use.

The rain collecting unit 30F comprises a water turbine 31F supported at the top end of the standing frame 21 for being run by rainfall and an energy converting unit 32F converting the water power as kinetic energy into electrical energy. Similar to the solar power system 30, the electrical energy converted from the water energy is stored in the power storage 40. Accordingly, the water turbine 31F comprises a plurality of water collecting blades for collecting water energy during rainfall, wherein rainwater (rain) is used to run the water turbine 31F to generate a rotational kinetic energy. Such kinetic energy can be converted into electrical energy via the energy converting unit 32F supported at the supporting frame 20 so as to store the electrical energy at the power storage 40.

Figure 12:
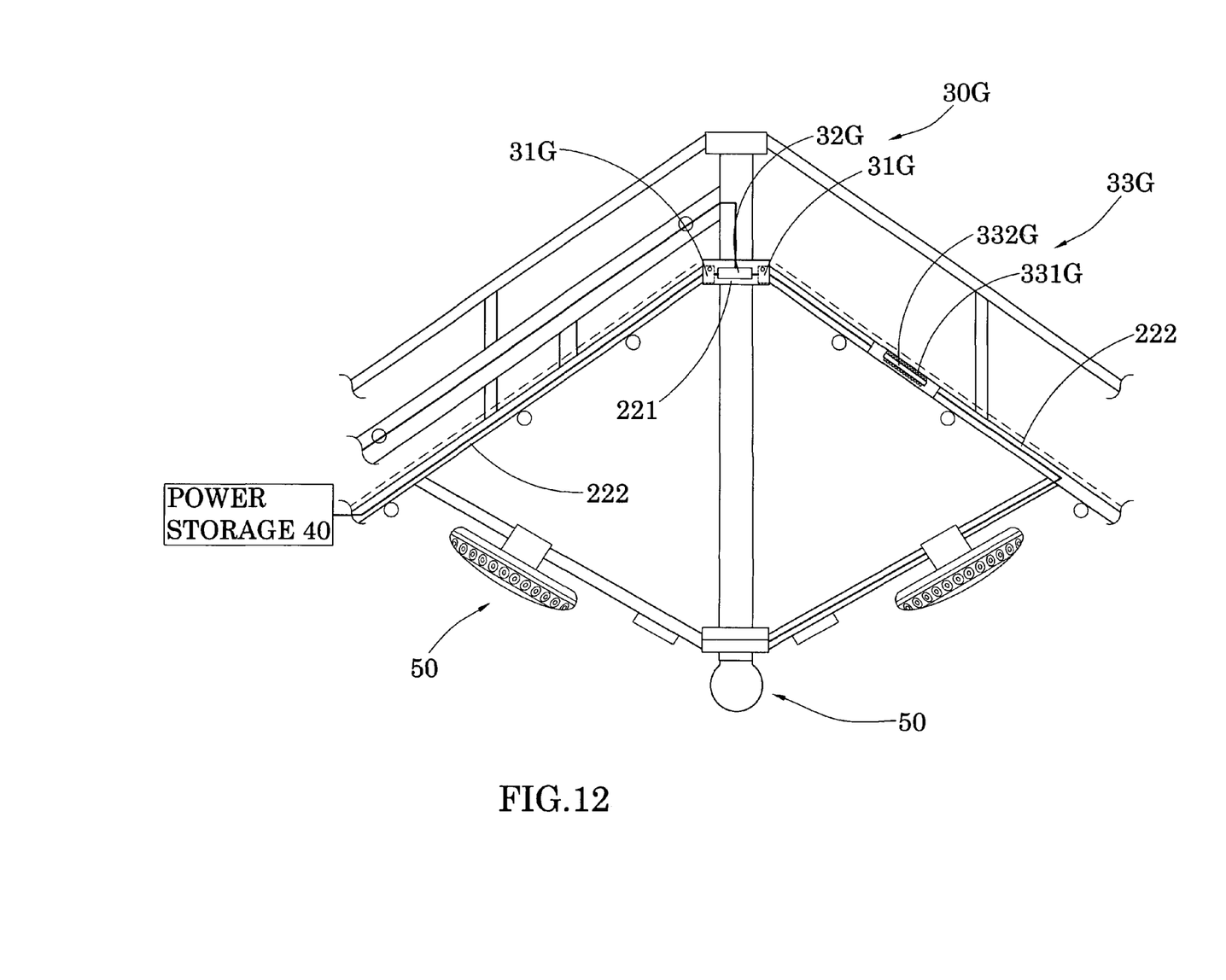
FIG. 12 illustrates a third alternative mode of the renewable power system of the outdoor shading device according to the above preferred embodiment of the present invention, illustrating the renewable power system as a kinetic power system.

FIG. 12 illustrates a third alternative mode of the renewable power system of the outdoor shading device, wherein the renewable power system is a kinetic power system for collecting kinetic energy from the supporting frame 20. As it is mentioned above, the awning supporting arms 222 are pivotally, outwardly and radially extended from the upper housing 221 in such a manner that they are adapted to move between the folded position and the unfolded position. The kinetic power system is adapted to collect the kinetic energy from the awning frame 22 during the folding operation.

Accordingly, the kinetic power system comprises a kinetic power collecting unit 30G provided at the upper housing 221 to operatively link with the pivot joints of the awning supporting arms 222 for extensively collecting kinetic energy. Moreover, the rain collecting unit 30G is adapted to collect kinetic energy and to convert the collected wind energy into electrical energy, wherein the electrical energy can be stored for further use.

The kinetic power collecting unit 30G comprises a rotational member 31G supported at the upper housing 221 to operatively link with the pivot joints of the awning supporting arms 222 in such a manner that during the folding operation of the outdoor shading device to fold or unfold the shading awning 10, the rotational member 31G is driven to rotate to generate kinetic energy. The kinetic power collecting unit 30G further comprises an energy converting unit 32G converting the kinetic energy into electrical energy. Similar to the solar power system 30, the electrical energy converted from the kinetic energy is stored in the power storage 40.

In addition, the kinetic power system further comprises an induction unit 33G provided at each of the awning supporting arms 222 for generating electrical energy during the folding operation of the outdoor shading device. Accordingly, the induction unit 33G comprises an induction coil 331G supported along each of the awning supporting arms 222 and a magnet element 332G freely sliding within the induction coil 331G for generating electromagnetic induction during the folding movement of each of the awning supporting arms 222. Therefore, every time when the awning supporting arms 222 are pivotally folded between the folded position and the unfolded position, the magnet elements 332G slide within the induction coils 331G respectively to generate electrical energy and to be stored in the power storage 40.

It is worth to mention that all different types of renewable power systems, including solar power system, wind power system, rain power system, and kinetic power system, can be incorporated with a single outdoor shading device such that the renewable power systems can collect different types of energies from natural resources at different environmental conditions. In other words, the renewable power system can collect solar energy during sunny day, wind energy during windy day, water energy during rainy day, and kinetic energy during the folding operation.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An outdoor shading device, comprising:
a supporting frame which comprises a standing frame and an awning frame supported by said standing frame;
a shading awning supported by said awning frame to define a shading area underneath said shading awning; and
a solar power system as a renewable power system, which comprises:
a renewable collecting unit comprising a solar collecting unit supported by said supporting frame for collecting energy from natural resources, wherein said solar collecting unit comprises a flexible solar layer having a solar collecting surface overlapped on said shading awning for solar energy collection, wherein when said shading awning is orientated for providing shade from the sun, said solar collecting surface of said solar collecting unit is aligned to face forward the sun to maximize the solar energy collection, such that after said solar energy is collected, said solar collecting unit converts said solar energy into electrical energy;
a power storage supported at said supporting frame to electrically connect to said renewable collecting unit, wherein when said renewable collecting unit collects said energy, said energy is converted into electrical energy and stored in said power storage; and
a reinforcing frame alignedly coupled with said awning frame to lock and retain said solar collecting surface of said solar collecting unit on said shading awning.

2. The outdoor shading device, as recited in claim 1, wherein said solar collecting unit comprises a plurality of discrete solar panels coupled to said flexible solar layer and alignedly overlaid on said shading awing to fully utilize a shading surface of said shading awning so as to maximize a gain of said solar energy.

3. The outdoor shading device, as recited in claim 2, wherein said discrete solar panels are foldably coupled with each other side-by-side such that said discrete solar panels are orientated to match with a contour of said shading surface of said shading awning.

4. The outdoor shading device, as recited in claim 2, wherein said flexible solar layer is attached on said shading surface of said shading awning to match with a contour of said shading surface of said shading awning.

5. The outdoor shading device, as recited in claim 4, wherein said flexible solar layer is integrally attached on said shading surface of said shading awning to form a one piece parasol structure for providing a dual-function of sun shading and solar energy collection.

6. The outdoor shading device, as recited in claim 3, wherein said flexible solar layer is attached on said shading surface of said shading awning to match with a contour of said shading surface of said shading awning.

7. The outdoor shading device, as recited in claim 6, wherein said flexible solar layer is integrally attached on said shading surface of said shading awning to form a one piece parasol structure for providing a dual-function of sun shading and solar energy collection.

8. The outdoor shading device, as recited in claim 7, wherein said awning frame comprises an upper housing coupled at an upper portion of said standing frame and a plurality of awning supporting arms pivotally and radially extended from said upper housing to support said shading awning so as to enable said awning frame being folded between a folded position to minimize said shading area and an unfolded position to provide shade from the sun and to collect said solar energy at the same time.

9. The outdoor shading device, as recited in claim 8, wherein said power storage comprises a rechargeable battery supported at a base of said standing frame for storing said electrical energy from said solar collecting unit, and a power outlet which is supported by said standing frame at a hand-reachable position and is electrically extended from said rechargeable battery for electrically connecting with an external electronic appliance.

10. The outdoor shading device, as recited in claim 7, wherein said power storage comprises a rechargeable battery supported at a base of said standing frame for storing said electrical energy from said solar collecting unit, and a power outlet which is supported by said standing frame at a hand-reachable position and is electrically extended from said rechargeable battery for electrically connecting with an external electronic appliance.

11. The outdoor shading device, as recited in claim 2, wherein said awning frame comprises an upper housing coupled at an upper portion of said standing frame and a plurality of awning supporting arms pivotally and radially extended from said upper housing to support said shading awning so as to enable said awning frame being folded between a folded position to minimize said shading area and an unfolded position to provide shade from the sun and to collect said solar energy at the same time.

12. The outdoor shading device, as recited in claim 2, wherein said power storage comprises a rechargeable battery supported at a base of said standing frame for storing said electrical energy from said solar collecting unit, and a power outlet which is supported by said standing frame at a hand-reachable position and is electrically extended from said rechargeable battery for electrically connecting with an external electronic appliance.

13. The outdoor shading device, as recited in claim 1, wherein said awning frame comprises an upper housing coupled at an upper portion of said standing frame and a plurality of awning supporting arms pivotally and radially extended from said upper housing to support said shading awning so as to enable said awning frame being folded between a folded position to minimize said shading area and an unfolded position to provide shade from the sun and to collect said solar energy at the same time.

* * * * *